US 8,888,601 B2

(12) United States Patent
Vogel et al.

(10) Patent No.: US 8,888,601 B2
(45) Date of Patent: Nov. 18, 2014

(54) PLAYER SEGMENTATION BASED ON PREDICTED PLAYER INTERACTION SCORE

(71) Applicant: SAP AG, Walldorf (DE)

(72) Inventors: Andreas Vogel, San Francisco, CA (US); Christian Scheelen, Palo Alto, CA (US)

(73) Assignee: SAP AG, Walldorf (DE)

( * ) Notice: Subject to any disclaimer, the term of this patent is extended or adjusted under 35 U.S.C. 154(b) by 20 days.

(21) Appl. No.: 13/659,583

(22) Filed: Oct. 24, 2012

(65) Prior Publication Data

US 2013/0316836 A1    Nov. 28, 2013

Related U.S. Application Data

(60) Provisional application No. 61/651,428, filed on May 24, 2012.

(51) Int. Cl.
*A63F 9/24*    (2006.01)
*G06F 17/40*    (2006.01)
*G07F 17/32*    (2006.01)

(52) U.S. Cl.
CPC ............... *G07F 17/32* (2013.01); *G06F 17/40* (2013.01)
USPC ............................................. 463/43; 463/42

(58) Field of Classification Search
USPC .................... 463/16, 25, 42, 43; 705/14.12
See application file for complete search history.

(56) References Cited

U.S. PATENT DOCUMENTS

| | | | |
|---|---|---|---|
| 7,035,653 B2 * | 4/2006 | Simon et al. | 455/466 |
| 2003/0109305 A1 | 6/2003 | Gavin et al. | |
| 2005/0143174 A1 | 6/2005 | Goldman et al. | |
| 2005/0153767 A1 | 7/2005 | Gauselmann | |
| 2007/0082738 A1 | 4/2007 | Fickle et al. | |
| 2010/0041475 A1 | 2/2010 | Zalewski et al. | |
| 2010/0324908 A1 | 12/2010 | Rosser et al. | |
| 2012/0040761 A1 * | 2/2012 | Auterio et al. | 463/42 |
| 2012/0122570 A1 | 5/2012 | Barnoff | |
| 2012/0238353 A1 * | 9/2012 | Herrmann et al. | 463/25 |
| 2013/0005438 A1 * | 1/2013 | Ocko et al. | 463/25 |
| 2013/0005447 A1 * | 1/2013 | Lutnick et al. | 463/25 |
| 2013/0029766 A1 * | 1/2013 | Wickett et al. | 463/42 |
| 2013/0079120 A1 * | 3/2013 | Walker et al. | 463/25 |
| 2013/0095460 A1 | 4/2013 | Bishop | |
| 2013/0095927 A1 * | 4/2013 | Rietman | 463/42 |

* cited by examiner

*Primary Examiner* — William Brewster
*Assistant Examiner* — Jason Skaarup
(74) *Attorney, Agent, or Firm* — Fountainhead Law Group PC

(57) ABSTRACT

A gaming system identifies players in a game. A player interaction score may be computed for an identified player. One or more engagement actions may be generated based on the player interaction score. The gaming system may engage the identified player according to the one or more engagement actions. In some embodiments, the player interaction score may be used to categorize the identified player in a player segment, which in turn may be used as a basis for generating engagement actions.

17 Claims, 8 Drawing Sheets

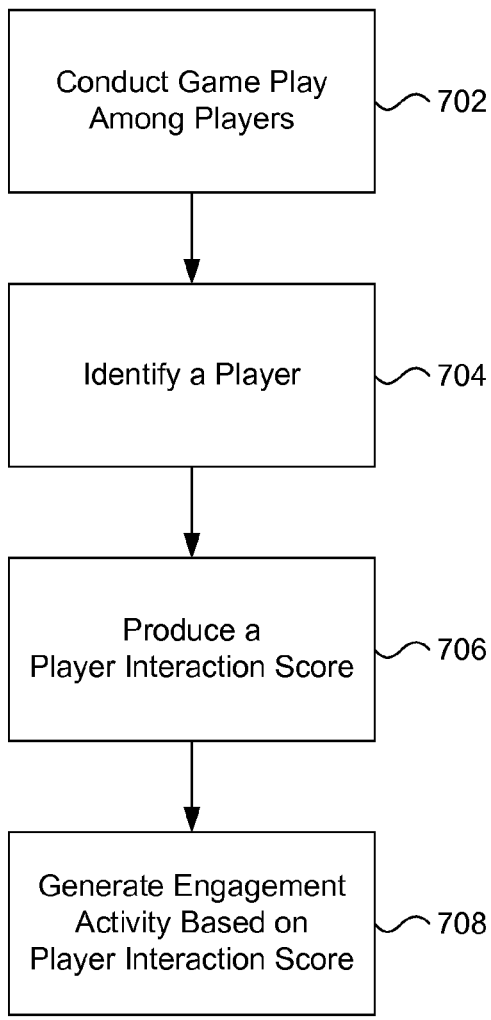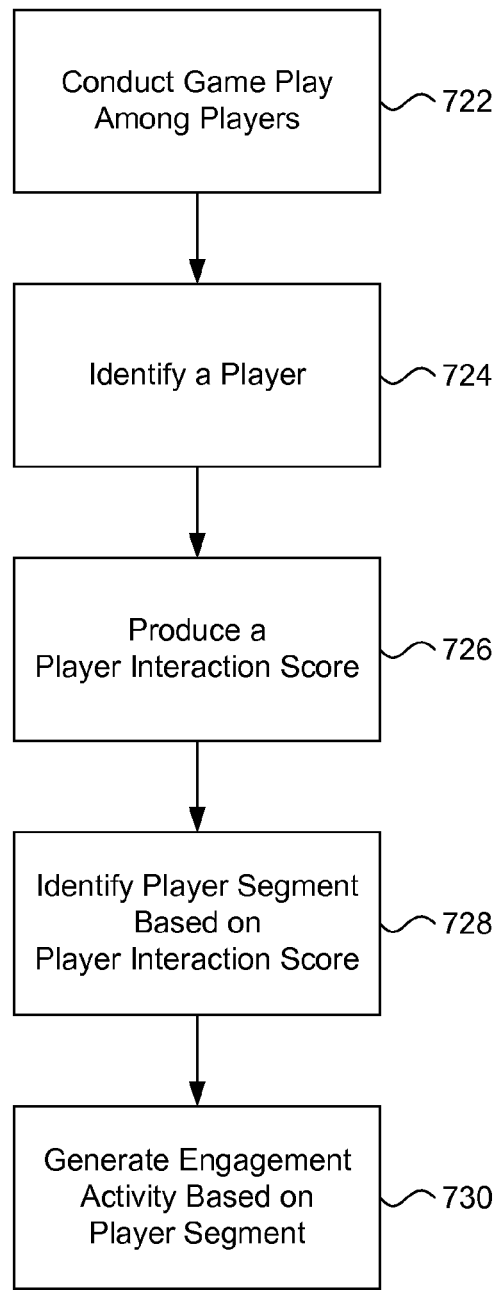
Fig. 7A
Fig. 7B

PLAYER SEGMENTATION BASED ON PREDICTED PLAYER INTERACTION SCORE

CROSS REFERENCE TO RELATED APPLICATIONS

The present disclosure claims priority to U.S. Provisional App. No. 61/651,428 filed May 24, 2012, the content of which is incorporated herein by reference in its entirety for all purposes. The present disclosure is related to the following commonly owned, concurrently filed applications, the disclosure of each of which is hereby incorporated by reference in its entirety for all purposes:

U.S. application Ser. No. 13/659,56561, entitled "PREDICTIVE ANALYTICS FOR TARGETED PLAYER ENGAGEMENT IN A GAMING SYSTEM"

U.S. application Ser. No. 13/659,613, entitled "PREDICTIVE ANALYSIS BASED ON PLAYER SEGMENTATION"

U.S. application Ser. No. 13/659,517, entitled "ARTIFICIAL INTELLIGENCE AVATAR TO ENGAGE PLAYERS DURING GAME PLAY"

BACKGROUND

Unless otherwise indicated herein, the approaches described in this section are not prior art to the claims in this application and are not admitted to be prior art by inclusion in this section.

Online gaming is becoming a significant business enterprise. The Internet makes gaming accessible to players around the world. However, challenges exist to convert "free" players into "paying" players and to maintain a steady revenue from players. For example, reducing the churn rate (i.e., the number of players who leave the game after playing and never return) increases the likelihood of more paying players. Challenges exist for popularizing a game. Players may be discouraged if a game is too difficult to play. On the other hand, players may quickly loose interest if game play is not sufficiently challenging.

BRIEF DESCRIPTION OF THE DRAWINGS

FIGS. 7A and 7B illustrate a workflow for processing player interaction scores in accordance with the present disclosure.

DETAILED DESCRIPTION

Disclosed embodiments relate to a gaming system that associates players with a player interaction score. The gaming system engages players in a manner based on the player interaction score. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
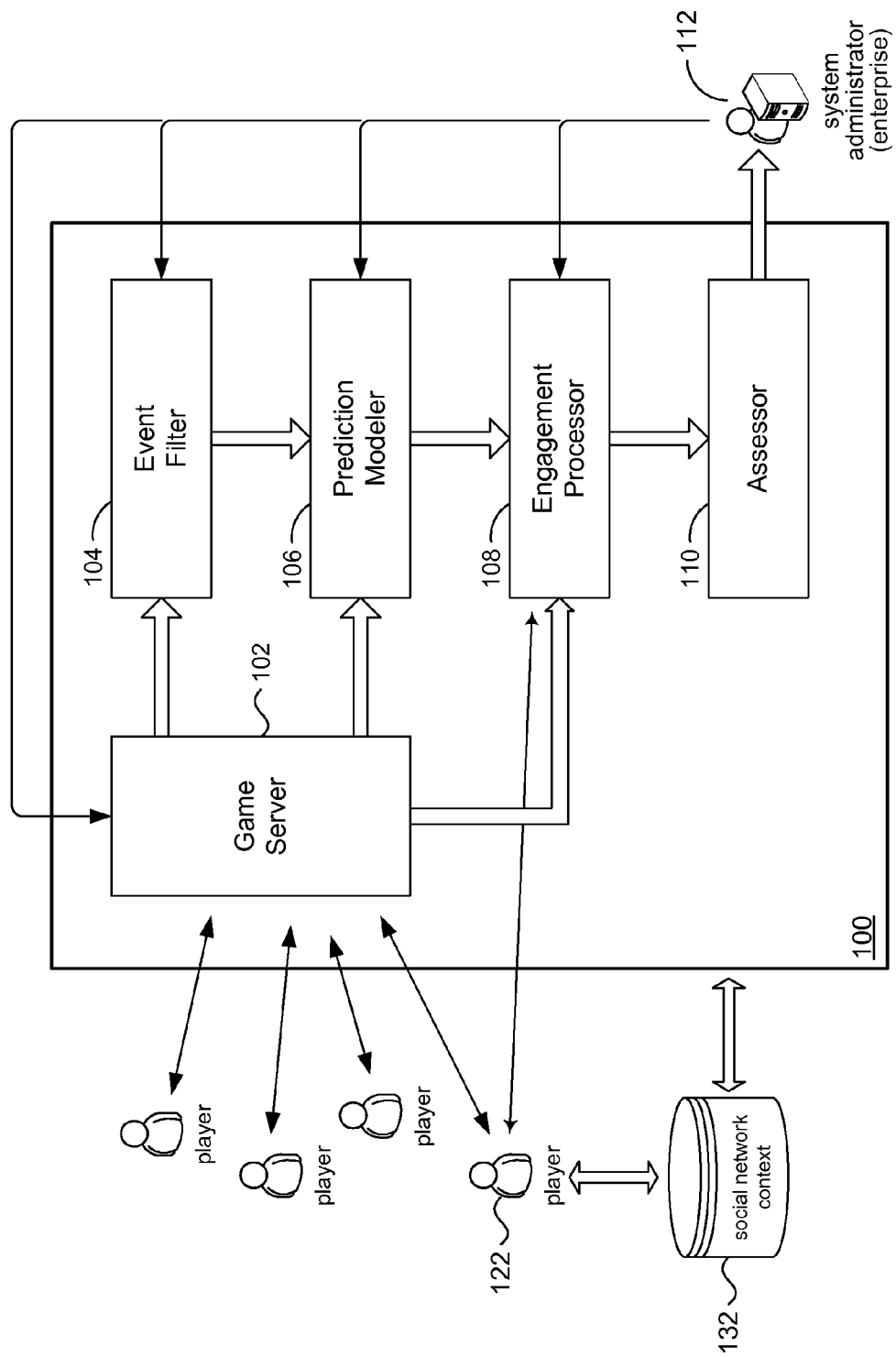
FIG. 1 shows a high-level system diagram of a gaming system according to the present disclosure.

FIG. 1 is a high level block diagram of a gaming system 100 in accordance with principles of the present disclosure. In some embodiments, the gaming system 100 may include a game server 102, an event filter 104, a prediction modeler 106, an engagement processor 108, and an assessor 110. The gaming system 100 may be hosted or otherwise operated by an enterprise ("game publisher", not shown). In some embodiments, the game may be an online game that players log onto in order to enter the game; an example of online gaming systems are known as massively multiplayer online role-playing games (MMORPG). The gaming system 100 may be free for new users, but may require payment for continued play. Players may purchase game items (e.g., weapons, ammo, transportation, etc.) in order to facilitate their progress in the game, and so on.

The game server 102 may provide a game infrastructure and game mechanics to support game play among players of the game, such as supporting a gaming environment within which players may interact with each other and with elements of the game (e.g., "game elements" such as structures, non-player characters—NPCs, and so on), maintaining and managing state changes in the gaming environment, providing interfaces for players, and so on. Events (game events) may occur during game play. For example, players' actions may cause game events; changes in a player's state may result in a game event (player dies, levels up, and so on), changes in the states of the game elements may cause game events (e.g., a weapon runs out of ammo), and so on.

Game events generated by the game server 102 during game play may be provided to the event filter 104. In accordance with the present disclosure, the event filter 104 may identify a player (e.g., player 122) based on one or more game events that occur during game play. The game event may be as simple as the player logging on to the game, or that the player has been killed, or is trapped somewhere, and so on. The game event that triggers the identification of the player may arise from the occurrence of a series of other game events involving the player or other players, or events involving game elements. In some embodiments, the event filter 104 may identify a group of players. Though the remaining description assumes the event filter 104 has identified one player, the discussion may apply equally to a group of identified players.

The prediction modeler 106 may model player behaviour to assess how likely a player (e.g., player 122) is to exhibit a specific behaviour under a given set of circumstances during game play. The prediction modeler 106 may then output one or more predictions of what the player may do (outcomes). The game server 102 may provide state information and game events generated during game play to the prediction modeler 106 as a basis for making one or more predictions about what the player may do in given their situation in the game.

The predicted outcome(s) of the prediction modeler 106 may then feed into the engagement processor 108. Based on predictions made by the prediction modeler 106 and other factors such as relevant game context and social network context 132, for example, the engagement processor 108 may generate engagement activity to engage the player. For example, the engagement activity may include actions relating to game play, actions involving commercializing aspects of game play (e.g., becoming a paying player, purchase virtual items, etc.), targeted advertising, and so on.

The assessor 110 may be used to facilitate making adjustments in various components in the gaming system 100. In some embodiments, the assessor 110 may collect data from the engagement processor 108, which may be used to assess the effectiveness of the engagement activities produced by the engagement processor. A system administrator 112 may be someone in the enterprise who can make adjustments to one or more components in the gaming system 100 based on information provided by the assessor 110. In some embodiments, the system administrator 112 is a human operator, and in other embodiments the system administrator 112 may include some degree of automation.

Figure 2:
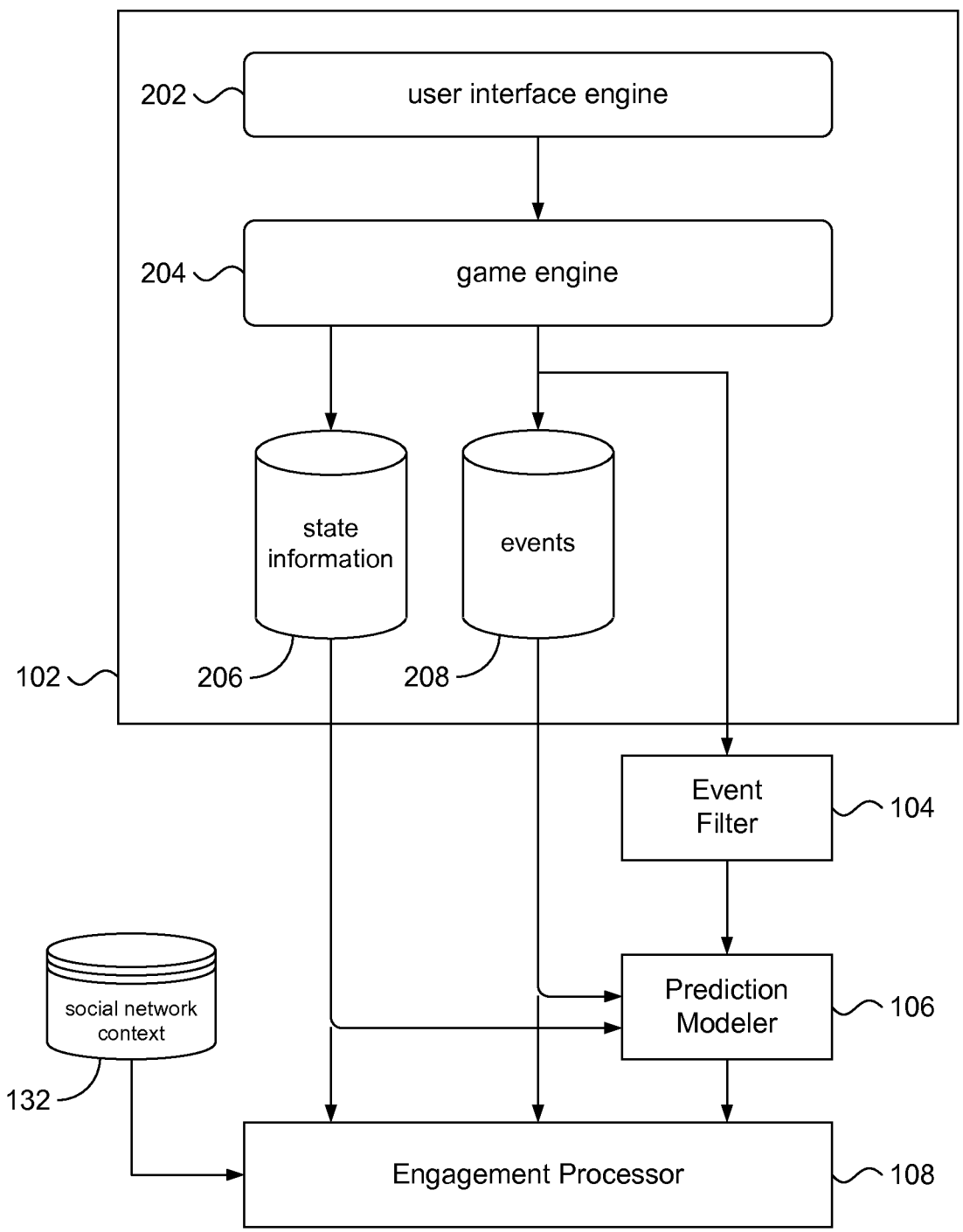
FIG. 2 shows details of the game server shown in FIG. 1.

FIG. 2 shows some additional details of the game server 102 in accordance with the present disclosure. The game server 102 may include a user interface engine 202, a game engine 204, a state information data store 206, and a game events data store 208. The user interface engine 202 may provide graphics rendering capability to produce video and other display information for game play. Input processing from various input devices (e.g., mouse device, keyboard, and so on) may be processed through the user interface engine 202. Access to the gaming system 100 may be provided over the Internet (e.g., via a web browser) or a game application (e.g., executing on a computing device such as a laptop computer, a smartphone, a computer tablet, and so on). For example, the user interface engine 202 may provide a Web services interface for access over the Web. In some embodiments, the user interface engine 202 may interface with a player's game console over the Internet.

The game engine 204 may provide rules processing, event generation and processing, game mechanics, a game environment, and other game infrastructure to manage game play. Players and the game environment (e.g., non-player game elements, and the like) have states (e.g., player is alive and has 1000 experience points, a structure has be destroyed, etc.) that change during game play. The game engine 204 may manage these state changes (collectively referred to as "game state") according to game rules which govern game play. The state information data store 206 may store and manage the game state, including current game state information of the players (e.g., health levels, experience levels, location, possessions, achievements, etc.) and current game state information of the game environment (e.g., number of players in the game, health levels of game elements such as structures and creatures, time of day in the game, etc.).

The game engine 204 may identify the occurrence of game events during game play. In some embodiments, game events may be defined by the game rules. When a game event is deemed to have occurred, the game engine 204 may issue an event (e.g., an event message) to other elements of the game engine. In some embodiments, the game engine 204 may store generated game events in the event data store 208. The game engine 204 may include a time base to synchronize the game state and the game events. Game play may be recorded by storing all the game state changes and game events in the data stores 208, 206.

The game engine 204 may provide the game events to the event filter 104 in addition to being stored in the events data store 208. Game state information and game events may be accessed by the predication modeler 106 via the state information data store 206 and the events data store 208, respectively. The prediction modeler 106 may use game state information and game events to predict the behaviour of a player (e.g., player 122) identified in the event filter 104. By using the current game state of the game environment and the players in the game, the prediction modeler 106 can make a prediction of the what the player is likely to do.

Likewise, the engagement processor 108 may access the state information data store 206 and the events data store 208 to inform the process of generating one or more engagement actions for engaging with the player. The engagement processor 108 may access the social network context 132 to further inform the process of generating suitable engagement actions. By using the current game state and current state of the player, the engagement processor 108 may generate engagement activity that is highly relevant to the player's current situation in the game, thus encouraging engagement by the player who may benefit from the engagement.

Figure 3:
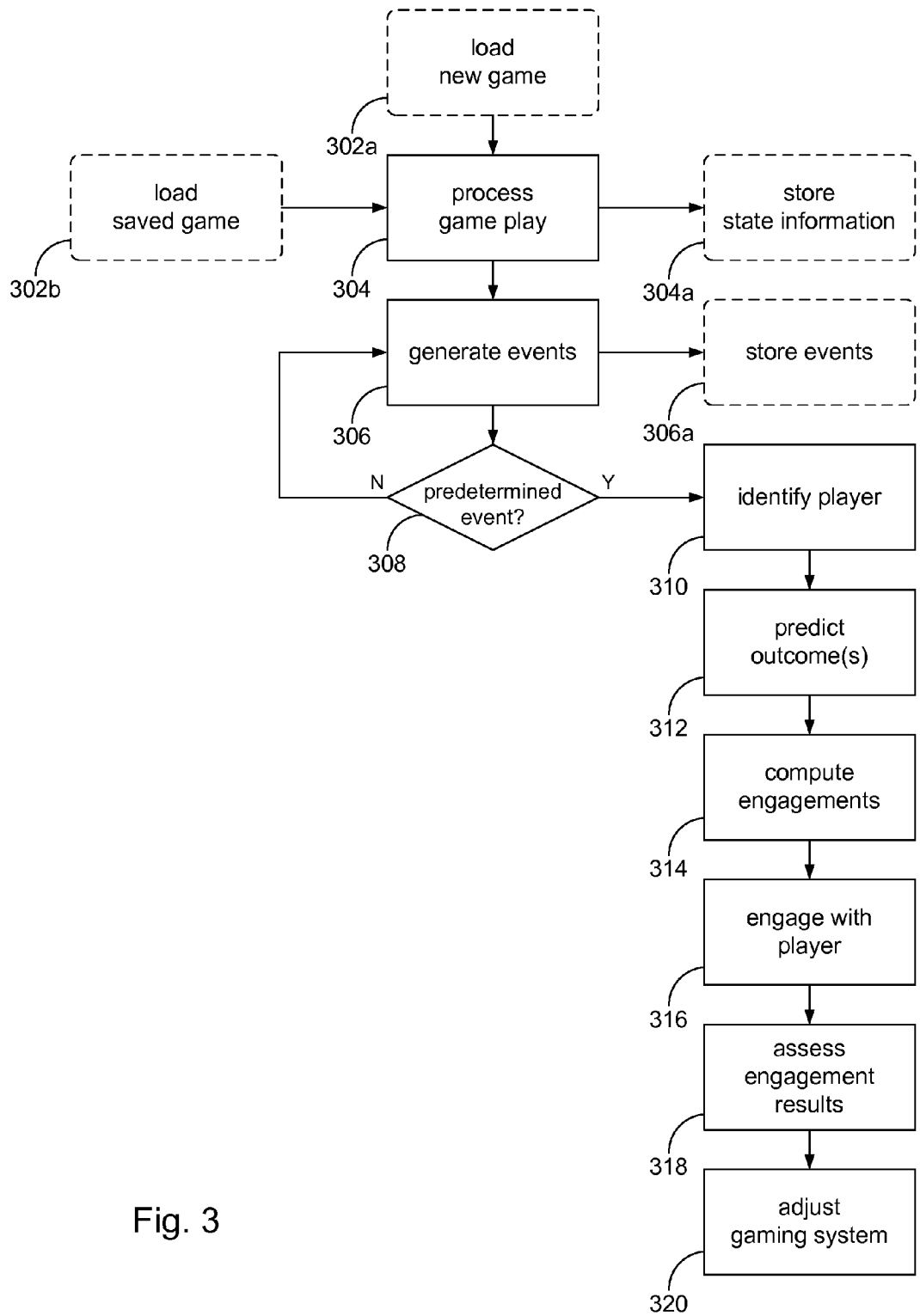
FIG. 3 depicts a workflow within the gaming system according to the present disclosure.

Referring to FIG. 3, a workflow in the gaming system 100 in accordance with the present disclosure includes loading a game. The gaming system 100 may load new game 302a, or the gaming system may load a previously saved game at 302b. At 304, the gaming system 100 may process game play. In the case of a newly initialized game (at 302a), the gaming system 100 may manage game play as players interact with each other in the game environment or with elements in the game environment from the game's initial game state.

If a previously saved game was loaded (at 302b), the gaming system 100 may continue with game play from the game state at the save point. Changes in the state of the players and in the game environment as game play progresses, whether in a new game or from a saved game, may be stored (at 304a) in the state information data store 206. On the other hand, if the previously saved game that was loaded at 302b is simply being replayed, as one would replay a previously recorded video recording, then the processing of game play at 304 will not include storing state information (304a) since no changes of state will occur by simply replaying the previously saved game.

At 306, the game engine 204 may generate game events as game play progresses, whether in a new game or from a previously saved game. Any occurrence in the game environment or with the players during game play may be treated as a game event. In some embodiments, the occurrence of a series of game events may be treated as a game event. At 306a, game events generated during game play may be stored in the event data store 208. On the other hand if a previously saved game is simply being replayed, then processing at 306a is not needed since game events generated at 306 are simply the result of replaying a previously recorded game.

In some embodiments, processing from 308 and following may proceed irrespective of whether the game is being played out or a previously saved game is being replayed. Game events are presented to the event filter 104. The event filter 104 monitors game events and looks for predetermined game events at 308. In accordance with the present disclosure, the event filter 104 serves to identify a player at 310 based on certain game events. The player becomes the target of an engagement, for example, to encourage the player to increase their participation in the game. The event filter 104 may be triggered based on situational game events. For example, when a new player first logs onto the game, the event filter 104 may identify that player as a target for engagement. If the player levels up, or if the player has died for the fifth time, and so on, the event filter 104 may be triggered to identify the player associated with the event as a target for engagement. The event filter 104 may be triggered based on temporal game events; e.g., the player has played for six straight hours, or it has been 48 hours since the player registered as a new player, or the player reached a certain level within a certain period of time, and so on. A game event may be triggered if the player has not logged into the game for some period of time.

When the event filter 104 has identified a player at 310, the prediction modeler 106 may be invoked at 312 to make one or more predictions (outcomes) as to what the player may do under the given circumstances. For example, if a player is killed during game play, that game event (death of a player) may be used to identify the player as a subject for the prediction modeler 106.

In some embodiments, the prediction modeler 106 may implement and evaluate any one or more known predictive algorithms, such support vector machines, linear regression models, decision trees, etc., to model the player's behaviour. Inputs (prediction variables) to the prediction modeler 106 depend on the particular algorithms and on the training data used to develop the models. Accordingly, prediction variables may be based on game events that occur during game play, the player's game state, the game state of other players, the state of the game environment, and so on.

In some embodiments, outcomes of interest that may be predicted by the predictive algorithms may include the player quitting the game, the player making an initial payment to continue playing the game, the player purchasing a game item, and so on. A player may be predicted to make payments for multiple categories of virtual items. In other embodiments, outcomes may indicate the player is likely to purchase real-life items (e.g., a T-shirt, instruction booklets), and so on. In some embodiments, the predictive algorithms may adapt over time in order to change the nature of the outcomes that are predicted. For example, a predicted outcome for a new player may be a decision to register as a paying player, whereas a player who has played for some number of months may be predicted to purchase high-end gaming items in order to advance or otherwise enhance their game play.

The outcome(s) predicted by the prediction modeler 106 may then be processed by the engagement processor 108, at 314, to generate engagement activities, such presenting one or more recommendations or suggestions, offers to purchase real or virtual items, and so on with which to engage the player. For example, suppose the player was identified by the death of the player, the engagement activity may be a recommendation to the player to take some action to avoid dying on the next go around. The engagement may be to offer the player to buy a virtual item; e.g., a weapon, or a potion, etc. In general, the engagement processor 108 may generate some form of engagement activity to engage the player identified at 310 and modeled at 312 to encourage continued interest in the game, to further their progress in the game, and so on.

In some embodiments, the engagement processor 108 may comprise a hybrid recommender system. Hybrid recommender systems are known and may comprise a combination of two or more single recommender systems. The engagement processor 108 may include expert rule processing to process the game context to further inform the process of generating the engagement activity. As a simple example, suppose the predicted outcome indicates that the player is likely to purchase items from the game. If the current game environment is that the player is in a burning building and the player is very low on health, then the engagement processor 108 may generate an engagement action comprising an offer to sell a "transport spell" to the player so that the player can teletransport out of the burning building.

In some embodiments, the engagement processor 108 may incorporate information from a social network context 132 to further inform the process of generating a suitable engagement activity. For example, the social network context 132 may comprise a list of players who are teamed up with the identified player in a cooperative game, or a list of players with whom the identified player communicates in the game. The game mechanics may provide a formal social networking infrastructure within the game environment. The engagement processor 108 may generate engagement activity based on actions of the other players in the identified player's social network. For example, if other players in the identified player's social network encountered the same situation confronting the identified player, the engagement action may be a hint as to what those players did to resolve the situation.

It can be appreciated from the foregoing examples that the engagement activity may be any kind of engagement with the player, and is not limited to selling items to the player. The engagement activity may include providing tips for game play, introducing the player to other players, and so on to help the player succeed in the game and thus continue playing the game. The engagement activity may serve to reduce the likelihood of churn; i.e., the player leaving the game. For example, the player may leave the game if they become bored or frustrated. Accordingly, the engagement activity may present new challenges to the player, or may include tips and tricks to overcome an obstacle that may be the source of frustration. And so on.

The engagement activity generated in 314 may then be put into action at 316. For example, if the player has been killed, the gaming system 100 may respawn the player and engage the player by providing hints, offering weapons, and so on before the player re-enters the game. The engagement may simply pop up on the player's interface; e.g., in a pop up window. For example, if the player has been stuck in a situation for some period of time (e.g., appears to be lost in building), an engagement action may include popping up a window and offering a suggestion on what to do. The player may be engaged in an off-line manner. For example, an email may be sent to the player, a text message may sent to the player, and so on. In some embodiments, for example, the engagement may include an interactive avatar such as disclosed in a concurrently filed U.S. application Ser. No. 13/659,517.

The assessor 108 may assess the effectiveness of the engagements, at 318. For example, the assessor 108 may track the success rate of engagement actions that are offers to sell a particular gaming item. The tracking information may include the circumstances under which the offer was made, the players' game states, the pricing structure, and so on. The assessor may track different kinds of advice that were given to players and what happened with those players (did they leave, did they buy things, etc.). The assessments may be displayed on a display device, or a report may be generated, and so on.

At 320, the system administrator 112 may make adjustments to the gaming system 100. In some embodiments, the system administrator's adjustments may be based on the assessments made by the assessor 108 at 318. Generally, any aspect of the gaming system 100 may be adjusted. For example, the game server 102 may be adjusted to change the difficultly level of some game elements, the pricing and price structure of virtual items may be changed. The event filter 104 may be adjusted to identify new types of players for targeting engagements. New prediction algorithms may be added to the prediction modeler 106, or existing algorithms may be tuned in order to improve prediction accuracy. The engagement processor 108 may be adjusted to refine the engagement activity, for example, to apply certain engagements for certain groups of players, alter the way the different players are engaged such as whether to engage during game play or offline, etc. The adjustments serve as feedback into the gaming system 100, thus tuning the gaming system to provide the best gaming experience for players while at the same providing opportunities to improve the revenue stream from the gaming system.

Figure 4:
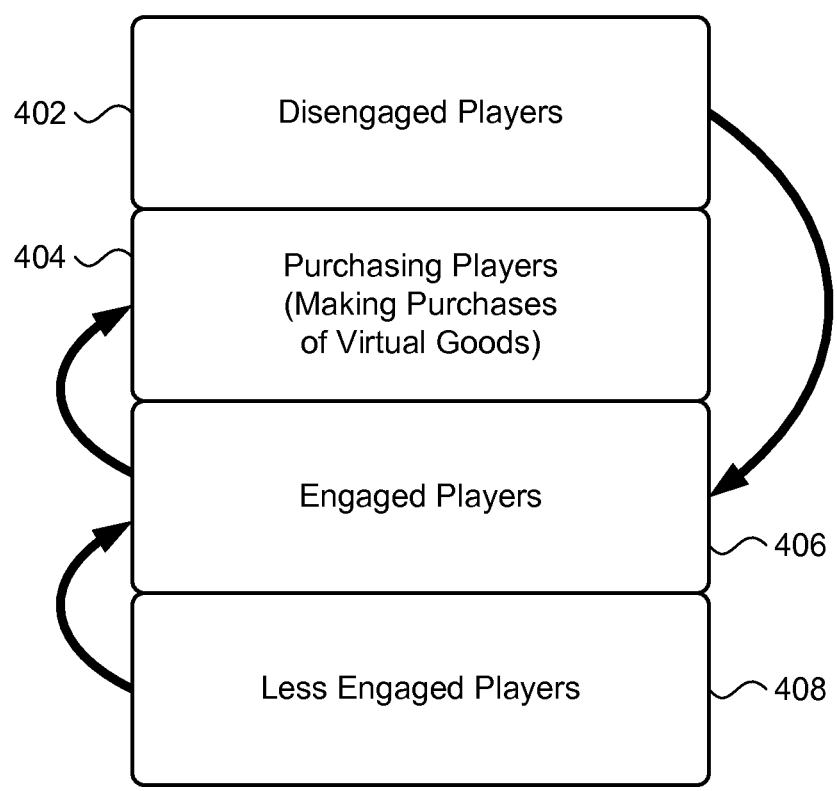
FIG. 4 illustrates the player segmentation in accordance with the present disclosure.

In some embodiments, the population of players in a game may be segmented into different "player segments." FIG. 4 illustrates an example of player segmentation in accordance with a specific embodiment of the present disclosure. The figure shows that players in a game may be categorized in a segment 402 called "disengaged", a segment 404 called "purchasing", a segment 406 called "engaged", and a segment 408 called "less engaged". It will be appreciated of course that other and additional player segments may be defined. In accordance with the present disclosure a player may be categorized into a player segment 402-408 based on their degree of participation in the game.

In some embodiments, the categorization of a player into a player segment 402-408 may be further based on the player's potential for commerce with the game publisher. For example, a "purchasing" player is deemed to be among the most engaged segment of players. Such a player may be engaged in several aspects of the game. The player may belong to one or more teams. The player may be logging on to the game on a regular and frequent basis; for example, the player may log on every day at 7 PM and play for several hours. The "purchasing" player is very likely to purchase virtual gaming items (e.g., spells, ammo, armor, transportation, etc.) in order to enhance their game play and make advances in the game. On the other hand, an "engaged" player is a player who may be as engaged in the game as a purchasing player, but unlike the purchasing player is not making purchases.

A "less engaged" player may be a player who is not be as interactive in the game as their "purchasing" or "engaged" counterparts. The less engaged player may not log on to the game as frequently, or may not have joined a team, and so on. Such a player may wander about in the virtual game world solo, and may interact with non-player characters (NPCs), but on a less frequently basis than a more engaged player might.

A "disengaged" player may be a player who has registered for a demo or free version of the game, and is not otherwise a paying player. The disengaged player is not likely to have joined any teams or to be very interactive with other players. The disengaged player may not interact with NPCs; e.g., does not engage in battle with a monster. The disengaged player may simply wander about in the virtual world, but may not otherwise interact with objects in that world.

A game publisher may want to be able to identify players as belonging to one player segment or the other. With this information the game publisher may be able to produce and introduce engagement activity within the game to enhance the players' gaming experiences and thus increase their engagement level to the point of becoming purchasing players.

The foregoing definitions of player segments 402-408 are merely illustrative examples. The descriptions are qualitative and serve to illustrate some typical characteristics that may be used to categorize a player in a given player segment 402-408. In some embodiments, a quantitative approach may be used to categorize players in a game. For example, a metric referred to herein as the "player interaction score" may be computed to represent the degree of a player's participation in the game. Accordingly, each player segment 402-408 may be defined according to the degree of the player's participation in the game as represented by the player interaction score.

In some embodiments, the player interaction score may be a formula that is based on a single game play parameter relating to the player's game play, or on a combination of multiple game play parameters. Following is merely an illustrative example of typical game play parameters that may be computed based on a player's game play. Many other game play parameters may be defined:

level reached—The level that a player reaches after a certain amount of time may be used to compute a player interaction score. The computation may take into account how quickly the player reached a given level; e.g., reaching level 10 after three days of game play. An average rate at which the player advances levels may be factored into the player interaction score; e.g., after one month of game play, the player advanced a level every six days.

number of sessions—The number of game sessions that a player has with the game may be indicative of the degree of participation the player has with the game. The player interaction score may take into account the number of game sessions within a given period of time; e.g., the player logged on to the game three times in one week, or the player logs on to the game an average of four times a week, and so on.

time played—This game play parameter may track how much time a players has played the game in a given time period; e.g., the player has played the game for a total of 24 hours in a one week period, or the player plays on average three hours a day, and so on.

accumulations—A player interaction score may be based on a player's possessions; e.g., the number of experience points, how much money the player has collected from the game, how many items are in the player's possession, how many "kills" the player has made, and so on. The player's accumulations may be considered after playing for some period of time; e.g., the player earned $1000 virtual dollars after one week of game play.

The game play parameters may be specific or unique to the game being played. For example, a sports game may include the player's scoring performance.

Merely as illustrative examples, a player interaction score S may be "computed" by using an experience level L that a player has reached after one week of game play as the player interaction score; thus, $S=L$. Another example may incorporate multiple parameters, such as $S=L+wT$, where T may be the total time of game play in one week and w is a weighting factor. It will be appreciated that the player interaction score S may be computed using several game play parameters, combined in a more complex manner than shown in the simple examples given above; thus, in some embodiments, $S_P=F_1(p_0, \ldots, p_n)$, $S_P$ is the player interaction score for a player P, where $F_1$ is some function of game play parameters $p_0 \ldots p_n$ of player P.

Figure 5:
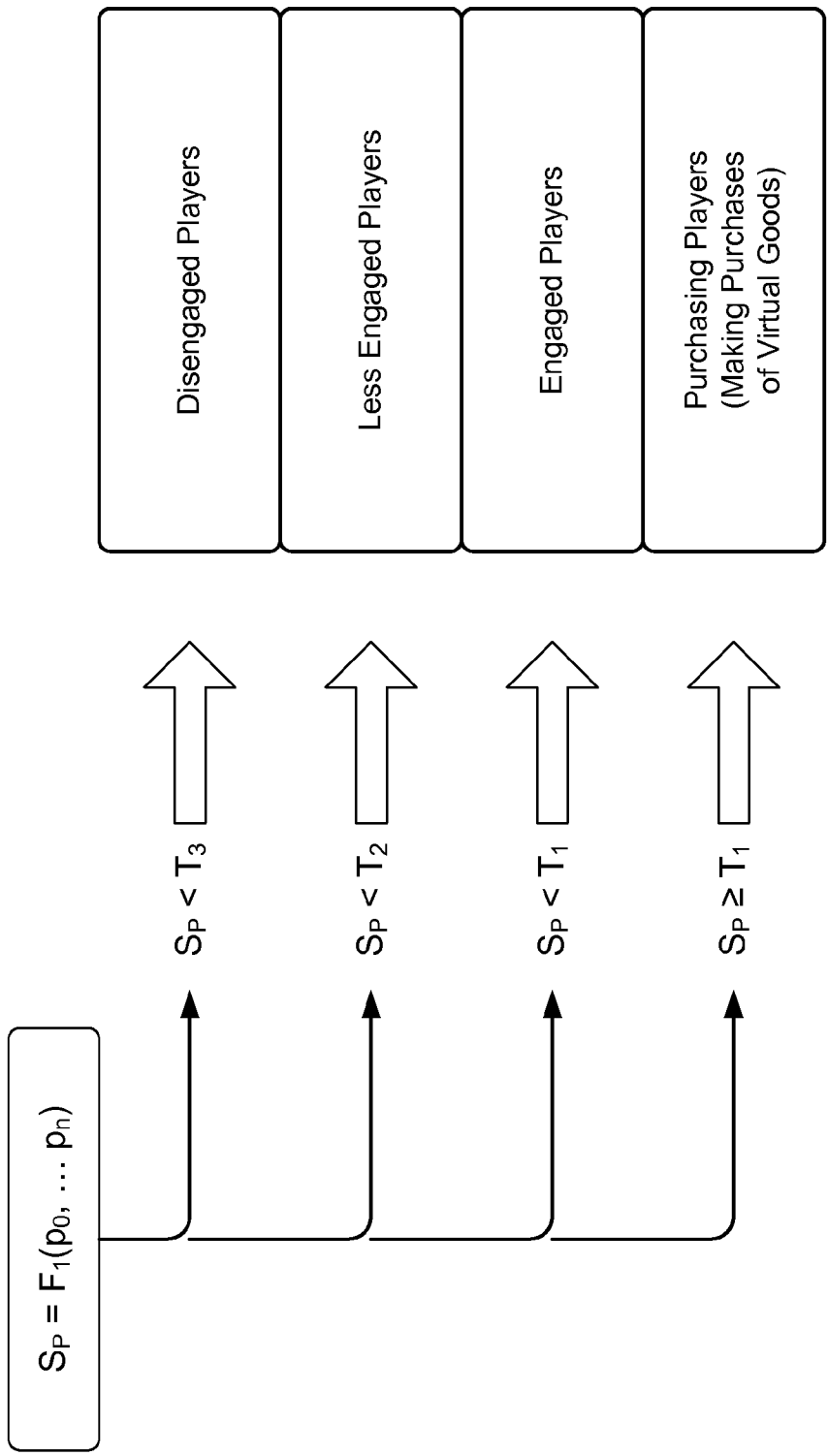
FIG. 5 illustrates using a player integration score to identify a player segment.

FIG. 5 illustrates an example of categorizing a player in a player segment 402-408 in accordance with the present disclosure. In some embodiments, the player's player interaction score $S_P$ may be compared against predetermined threshold values $T_1$, $T_2$, and $T_3$ to determine which player segment 402-408 the player should be categorized in. Thus, for example, if the player's player interaction score $S_P$ falls below a threshold value $T_3$, then the player may be categorized as a "disengaged" player. And so on for each player segment 402-408.

In some embodiments, the threshold values $T_1$, $T_2$, and $T_3$ may be static values, for example, provided by an administrative user, or obtained from a configuration file, and so on. In other embodiments, the threshold values $T_1$, $T_2$, and $T_3$ may be dynamic. For example, the threshold values $T_1$, $T_2$, and $T_3$ may be computed based on game parameters averaged over multiple players, or may be based on state information other than game parameters, and so on.

The player interaction score typically requires observing a player over a period of time; e.g., days or weeks. Not surprisingly, the longer the observation period (and hence more data), the more accurately a player can be categorized in one of the player segments 402-408. However, it may be desirable to be able to predict which player segment a player is likely to be categorized in based on a shorter observation period.

Accordingly, in some embodiments, the prediction modeler 106 component of gaming system 100 may evaluate a player model to produce a predicted player interaction score for a given player. Any of the known classification algorithms may be used; e.g., logistic regression, decision tree, support vector machines, and so on. As known by those of ordinary skill, a player model may be developed by taking existing ("training") data from a sample player population. The training data, for example, may be collected from a recorded game. A developer may evaluate each of the players in the sample player population and categorize them into one of the player segments 402-408. The developer may then look at the game parameters of those players and, using heuristics or simple trial and error, identify those game parameters which may be probative of the players' participation levels in the game. The identified game parameters may be expressed as a model, for example, as a statistical model, or a decision tree, etc. The training data may then be applied to test and refine the model. The final model may then be used to make predictions of player interaction scores in a real game situation.

In accordance with principles of the present disclosure, knowing a player's likely player segment category (vis-à-vis the player's predicted player interaction score) allows the gaming system 100 to engage the players in a way that can increase their participation in the game. Referring again to FIG. 4, the gaming system 100 may engage players to influence their game play in a way that leads the players into the "purchasing player" segment 404. In some embodiments, for example, if a player is predicted to be a "disengaged player", then the gaming system 100 may engage the player in a way that influences the player's game play to become an "engaged player". Similarly, the gaming system 100 may engage a "less engaged player" to be more active in the game, with the goal of becoming an "engaged player". For those players who are "engaged players", the gaming system 100 may engage those players in a way to encourage increased activity with the game so that they become "purchasing players". In other embodiments, the trajectory from one player segment to the next may follow paths different than shown in FIG. 4.

Figure 6:
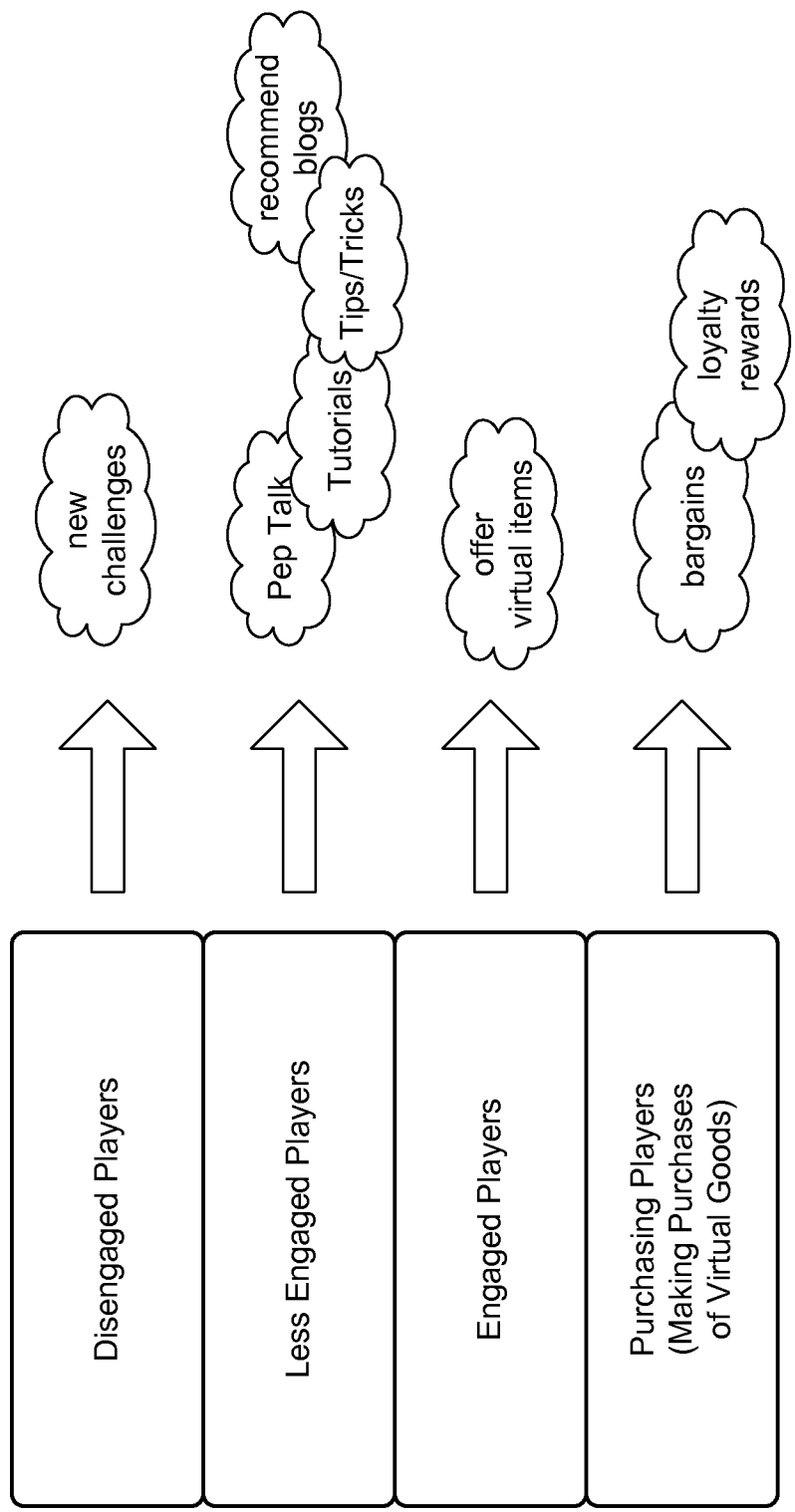
FIG. 6 illustrates generating engagement actions according to player segments.

Referring to FIG. 6, in some embodiments, the engagement processor 108 component of the gaming system 100 may generate engagement activities based on the player segment that a player is predicted to be categorized in. For example, a player who is predicted to be a "disengaged player" (e.g., by their predicted player interaction score), may need some form of encouragement to continue playing the game. If the player continues to play the game and comes to enjoy playing, then the player may be on a trajectory that leads them to eventually becoming a "purchasing player". Thus, for example, the kind of engagement activity that the engagement processor 108 generates for a "disengaged player" may include providing new game challenges to the player, perhaps because the game is not challenging enough or the player is bored.

For a "less engaged player", the engagement processor 108, for example, may generate activities such as giving the player some pep talk, recommending tutorials, providing hints (tip or tricks), recommending blogs or discussion groups, and so on.

The "engaged player" may be a player who is ready to advance their game, for example. Accordingly, the engagement processor 108 may engage such a player by making offers to sell virtual items that the player may use to enhance their game play experience.

The "purchasing player", by definition, is already purchasing virtual items. Here, the engagement processor 108 may give the player bargains on virtual items offered in the game, or give some loyalty points or rewards for being a continuing paying player. Other such offers may be made in order to keep the player in this category.

In some embodiments, the engagement processor 108 may take into account the player's current game state so that the gaming system 100 may engage the player in a meaningful way. For example, if a tutorial is being offered to a "less engaged player" a specific tutorial may be determined based on where in the game the player is. If the player is "engaged", then the engagement processor 108 may engage the player by offering an item that is relevant to the player's situation; e.g., the player is in a locked room, and the offer is to purchase a key to unlock the door. And so on.

A portion of the workflow shown in FIG. 3 is reproduced in FIGS. 7A and 7B, which emphasize the incorporation of a player interaction score in the workflow. Consider first FIG. 7A. At 702, the gaming system 100 may conduct game play among players, which may include loading a new game or loading a saved game and continuing from the saved point. A player may be identified at 704. In some embodiments, the player may be identified based on the occurrence of an event; for example, a log on event may identify the player. At 706, a suitable player model (or models) may be invoked in the prediction modeler 106 to make a prediction of a player interaction score for the identified player. In some embodiments, the predicted player interaction score may be used by the engagement processor 108, at 708, to generate one or more suitable engagement actions with which to engage the identified player.

Referring to FIG. 7B, in some embodiments, the workflow may include identifying a player segment. Blocks 722, 724, and 726 in FIG. 7B correspond to respective blocks 702, 704, and 706 in FIG. 7A. At 728, the predicted player interaction score may be used to identify a player segment 402-408 that a player identified at 724 may be categorized into. In some embodiments, threshold values as described above may be used as the criteria for identifying a player segment. At 730, the engagement processor 108 may generate one or more suitable engagement action(s) with which to engage the identified player based on the player segment identified at 728.

Figure 8:
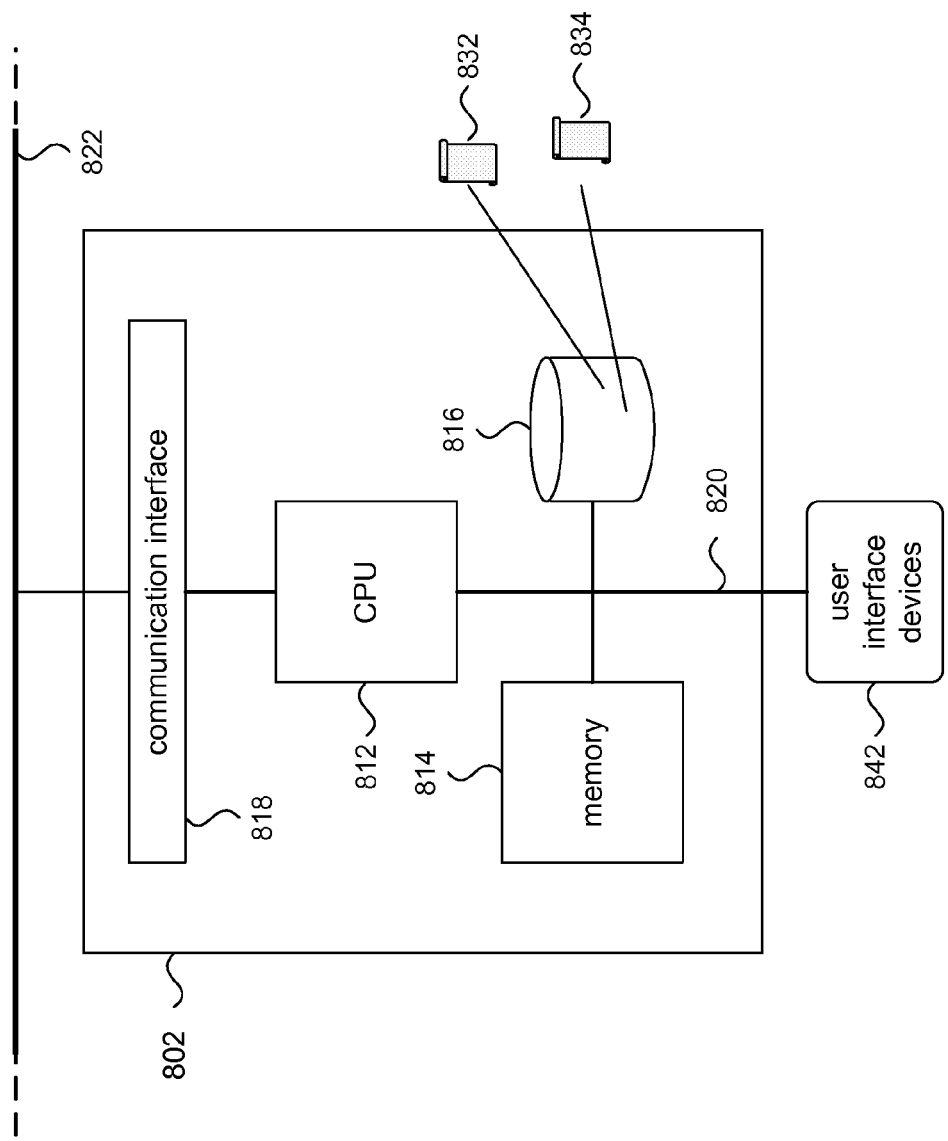
FIG. 8 illustrates a specific embodiment of the gaming system of the present disclosure.

FIG. 8 illustrates a high level block diagram of a computer system 802 configured and programmed to operate as gaming system 100 in accordance with the present disclosure. The computer system 802 may include a central processing unit (CPU) 812 or other similar data processing component. The CPU 812 may be a single processor or a multiprocessor subsystem. The computer system 802 may include various memory components. For example, the memory components may include a volatile memory 814 (e.g., random access memory, RAM) and a data storage device 816. A communication interface 818 may be provided to allow the computer system 802 to communicate over a communication network 822, such as a local area network (LAN), the Internet, and so on, allowing players to access the computer system 802 over the Internet. The communication interface 818 may provide Web services via a suitable Web services interface. An internal bus 820 may interconnect the components comprising the computer system 802.

The data storage device 816 may comprise a non-transitory computer readable medium having stored thereon computer executable program code 832. The computer executable program code 832 may be executed by the CPU 812 to cause the CPU to perform steps of the present disclosure, for example the processing set forth in FIG. 7A or 7B. In some embodiments, the CPU may evaluate player models to predict player interaction scores. The data storage device 816 may store various data structures 834 including, for example, game state information and game events, player segments, and so on. The data storage device 816 may represent either or both the state information data store 206 and the events data store 208.

The system administrator 112 may interact with the computer system 802 using suitable user interface devices 842, including for example, input devices such as a keyboard, a keypad, a mouse or other pointing device, and output devices such as a display. In some embodiments, for example, the system administrator 112 may provide threshold values $T_1$, $T_2$ and $T_3$ that can be used to identify player segments.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method in a gaming system comprising operating a computer system in the gaming system to perform steps of:
providing game play among a plurality of players in a game;
providing at least a first player segment, a second player segment, and a third player segment;
identifying a first player among the plurality of players;
producing a predicted player interaction score for the first player, which predicts a degree of interaction that the first player will have in the game;
associating the first player with the first player segment based on an outcome of a comparison between the predicted player interaction score and a first predetermined threshold value associated with the first player segment;
associating the first player with the second player segment based on an outcome of a comparison between the predicted player interaction score and a second predetermined threshold value associated with the second player segment;
associating the first player with the third player segment based on an outcome of a comparison between the predicted player interaction score and a third predetermined threshold value associated with the third player segment;
using the associated player segment to generate one or more engagement actions for the first player; and
communicating with the first player in accordance with the one or more engagement actions.

2. The method of claim 1 wherein the predicted player interaction score is based on a degree of interaction between the first player and elements of the game.

3. The method of claim 1 wherein the predicted player interaction score is based at least on parameters relating to length of time that the first player has engaged with the game.

4. The method of claim 1 wherein the predicted player interaction score is based at least on a rate at which the first player is engaging with the game.

5. The method of claim 1 wherein the predicted player interaction score is based at least on parameters relating to achievements made to the first player.

6. The method of claim 5 wherein the predicted player interaction score is based at least on a rate at which the first player is making the achievements in the game.

7. The method of claim 1 wherein the predicted player interaction score is based at least on parameters relating to virtual items in the games that are in possession of the first player.

8. The method of claim 7 wherein the predicted player interaction score is based at least on a rate at which the first player is coming into possession of the virtual items in the game.

9. The method of claim 1 wherein the game is a previously played game.

10. A gaming system comprising:
a computer system;
a data storage device having stored thereon computer executable program code, which, when executed by the computer system, causes the computer system to:
provide game play among a plurality of players in a game;
provide at least a first player segment, a second player segment, and a third player segment;
identify a first player among the plurality of players;
produce a predicted player interaction score for the first player, which predicts a degree of interaction that the first player will have in the game;
associate the first player with the first player segment based on an outcome of a comparison between the predicted player interaction score and a first predetermined threshold value associated with the first player segment;
associate the first player with the second player segment based on an outcome of a comparison between the predicted player interaction score and a second predetermined threshold value associated with the second player segment;
associate the first player with the third player segment based on an outcome of a comparison between the predicted player interaction score and a third predetermined threshold value associated with the third player segment;
use the associated player segment to generate one or more engagement actions for the first player based at least on the player segment that the first player is categorized in; and
communicate with the first player in accordance with the one or more engagement actions.

11. The system of claim 10 wherein the predicted player interaction score is based on a degree of interaction between the first player and elements of the game.

12. The system of claim 10 wherein the predicted player interaction score is based at least on parameters relating to length of time that the first player has engaged with the game.

13. The system of claim 10 wherein the predicted player interaction score is based at least on a rate at which the first player is engaging with the game.

14. The system of claim 10 wherein the predicted player interaction score is based at least on parameters relating to achievements made to the first player.

15. The system of claim 10 wherein the predicted player interaction score is based at least on parameters relating to virtual items in the games that are in possession of the first player.

16. A non-transitory computer-readable storage medium having stored thereon computer executable program code which can be executed by a computer system to perform steps of:

providing game play among a plurality of players in a game;

providing at least a first player segment, a second player segment, and a third player segment;

identifying a first player among the plurality of players;

producing a predicted player interaction score for the first player, which predicts a degree of interaction that the first player will have in the game;

associating the first player with the first player segment based on an outcome of a comparison between the predicted player interaction score and a first predetermined threshold value associated with the first player segment;

associating the first player with the second player segment based on an outcome of a comparison between the predicted player interaction score and a second predetermined threshold value associated with the second player segment;

associating the first player with the third player segment based on an outcome of a comparison between the predicted player interaction score and a third predetermined threshold value associated with the third player segment;

using the associated player segment to generate one or more engagement actions for the first player based at least on player segment that the first player is categorized in; and communicating with the first player in accordance with the one or more engagement actions.

17. The non-transitory computer-readable storage medium of claim 16 wherein the predicted player interaction score is based on a degree of interaction between the first player and elements of the game.

* * * * *